No. 656,486.
A. P. SMITH, Jr.
ROLLER CHAFE IRON.
(Application filed Jan. 3, 1900.)
Patented Aug. 21, 1900.
(No Model.)
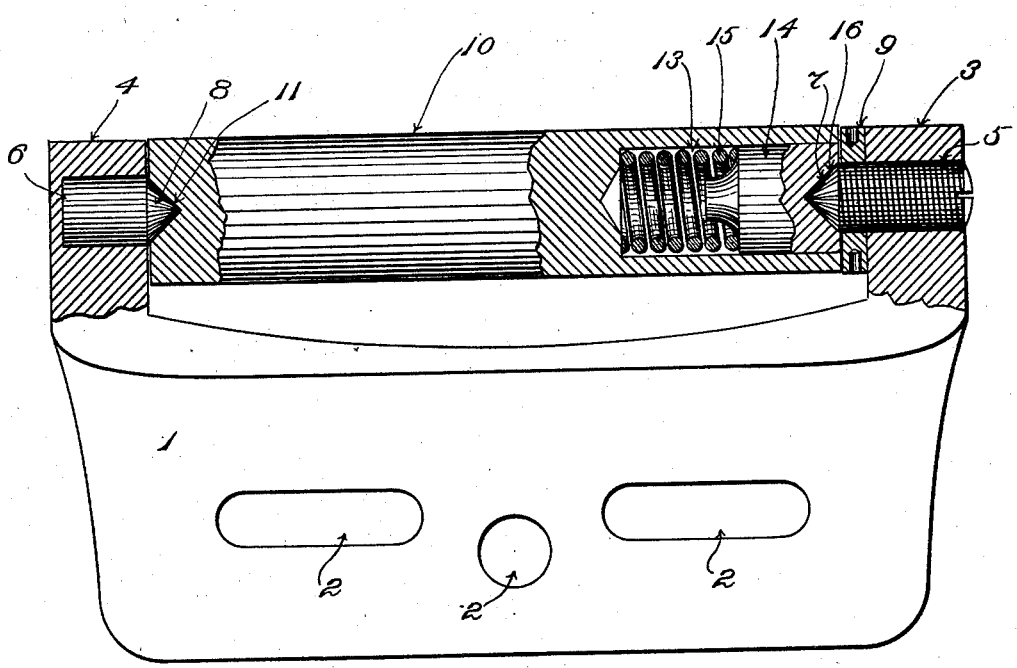
Witnesses:
Oscar F. Hill
Robert Wallace.
Inventor:
Alba Parker Smith Jr
by Wm A. Copeland
his Attorney.

UNITED STATES PATENT OFFICE.

ALBA PARKER SMITH, JR., OF BROCKTON, MASSACHUSETTS.

ROLLER CHAFE-IRON.

SPECIFICATION forming part of Letters Patent No. 656,486, dated August 21, 1900.

Application filed January 3, 1900. Serial No. 201. (No model.)

*To all whom it may concern:*

Be it known that I, ALBA PARKER SMITH, Jr., of Brockton, in the county of Plymouth and State of Massachusetts, have invented certain new and useful Improvements in Roller Chafe-Irons, of which the following is a specification.

My invention relates to roller chafe-irons which are attached to vehicles for the wheel to graze on when the vehicle is turned. As ordinarily constructed the rotation of the roller will gradually wear away its bearings, and after it becomes thus worn the roller has too much play and rattles when the vehicle is in motion.

The object of my invention is to provide a roller chafe-iron with an automatic take-up for the wear of the roller and its bearings.

My invention will now be fully described, having reference to the accompanying drawing, and the invention will be particularly pointed out in the claims at the close of this specification.

In the drawing the figure is a side elevation, partly in section, of a roller chafe-iron and its supporting-frame embodying my invention.

Referring now to the drawing, 1 is the frame for the chafe-iron, the precise form of the frame not being material. The one shown is of a well-known pattern and is provided with bolt-holes 2 to enable it to be secured to the vehicle. Projecting at each end of the frame are the bosses 3 4, in which are set the plugs or screws 5 6, having the cone-bearings 7 8, respectively. The screw-plug 5 is provided with a check-nut 9.

The roll 10, preferably made of steel, has a conical socket 11 in one end to receive the cone-bearing 8 of the plug 6. In the other end of the roll 10 is a socket 13, in which is the disk 14, seated on the spring 15, and having a conical socket 16 to receive the cone-bearing 7 of the screw 5. The spring 15 is under compression when the parts are assembled, so that there is a constant pressure of the spring against the disk to keep it in close contact with its bearing 7. As fast as the bearings or interior of the sockets for the bearings wear away the compression of the spring will push out the disk against the cone 17 and thus prevent any loosening or rattling of the roll.

What I claim is—

1. A roller chafe-iron for vehicles having in combination a roll, a frame having bearings for the roll, a socket in one end of the roll which receives one of the bearings which projects from the frame, a socket in the other end of the roll, a spring in said socket, a disk seated on said spring and having a socket therein, a screw-plug set in said frame which fits in the socket of the disk and forms the second bearing, substantially as described.

2. A roller chafe-iron for vehicles having in combination, a roll, a frame for the roll, bosses on the frame which hold the bearings for the roll, a plug in one of said bosses having a cone-bearing for one end of the roll, a socket in the other end of the roll, a spring in said socket, a disk seated on said spring and having a conical socket therein, a screw-plug in the second of said bosses on the frame having a cone-bearing which fits in the cone-socket of the disk, substantially as described.

3. A roller chafe-iron for vehicles having in combination, a roll, a frame, to which the roll is journaled, a plug inserted in one of the bearing-supports of the frame having a conical end which forms a bearing which fits in a conical recess in one end of the roll, a screw-plug which is mounted in a screw-hole in the other bearing-support of the frame having a conical end which forms the second bearing for the roll, a check-nut on said screw-plug, a socket in the end of said roll, a spring in said socket and a disk seated on said spring having a conical recess which receives said second bearing, substantially as described.

In testimony whereof I have affixed my signature in presence of two witnesses.

ALBA PARKER SMITH, JR.

Witnesses:
HENRY R. THOMPSON,
WILLIAM A. COPELAND.